United States Patent
Watts et al.

(10) Patent No.: US 9,244,471 B2
(45) Date of Patent: Jan. 26, 2016

(54) METHODS AND SYSTEMS FOR REMOTELY MONITORING AND CONTROLLING HVAC UNITS

(71) Applicants: Laurie Watts, Austin, TX (US); Robert Hafernik, Austin, TX (US)

(72) Inventors: Laurie Watts, Austin, TX (US); Robert Hafernik, Austin, TX (US)

(73) Assignee: Siemens Industry, Inc., Alpharetta, GA (US)

(*) Notice: Subject to any disclaimer, the term of this patent is extended or adjusted under 35 U.S.C. 154(b) by 392 days.

(21) Appl. No.: 13/829,874

(22) Filed: Mar. 14, 2013

(65) Prior Publication Data

US 2014/0277768 A1 Sep. 18, 2014

(51) Int. Cl.
G05D 23/19 (2006.01)
F24F 11/00 (2006.01)

(52) U.S. Cl.
CPC ........ *G05D 23/1905* (2013.01); *F24F 11/0012* (2013.01); *F24F 2011/0052* (2013.01); *F24F 2011/0068* (2013.01); *F24F 2011/0071* (2013.01)

(58) Field of Classification Search
CPC . F24F 11/0012; F24F 11/006; F24F 11/0086; F24F 11/0009; F24F 2011/0052; F24F 2011/0058; F24F 2011/0061; F24F 2011/0063; F24F 2011/0067; F24F 2011/0068; F24F 2011/0071; F24F 2011/0091; G05D 23/19; G05D 23/1902; G05D 23/1923; G05D 23/1931; G05D 23/1934; F25B 2700/2104; F25B 2700/2106; Y02B 70/3275; Y04S 20/244; F24D 19/10

USPC ........ 700/9, 83, 276–278; 236/1 C, 46 R, 51; 165/11.1, 205, 209, 212, 238
See application file for complete search history.

(56) References Cited

U.S. PATENT DOCUMENTS

| | | | | |
|---|---|---|---|---|
| 5,316,073 A | * | 5/1994 | Klaus et al. | 165/11.1 |
| 5,706,190 A | * | 1/1998 | Russ et al. | 700/9 |
| 5,924,486 A | * | 7/1999 | Ehlers et al. | 165/238 |
| 6,338,437 B1 | | 1/2002 | Kline et al. | |
| 6,385,510 B1 | | 5/2002 | Hoog et al. | |
| 7,295,896 B2 | * | 11/2007 | Norbeck | 700/276 |
| 7,748,225 B2 | * | 7/2010 | Butler et al. | 62/181 |
| 7,992,794 B2 | * | 8/2011 | Leen et al. | 236/51 |
| 8,113,789 B2 | * | 2/2012 | Douglas et al. | 417/38 |
| 8,950,688 B2 | * | 2/2015 | Babich | 236/51 |

(Continued)

OTHER PUBLICATIONS

PCT Search Report dated Aug. 19, 2014, for application No. PCT/US2014/026948, 10 pages.

*Primary Examiner* — Crystal J Barnes-Bullock

(57) ABSTRACT

Systems, methods, and medium remotely monitor and control heating, ventilation and air-conditioning (HVAC) units. The method includes receiving by a processor via a communication network supply temperature data indicating a supply air temperature in a duct coupled to an HVAC unit. The method includes receiving by the processor via the communication network zone temperature data of a space being maintained by the HVAC unit. The method includes receiving by the processor via the communication network thermostat data from a thermostat in the space and analyzing by the processor at least one of the supply temperature data, the zone temperature data and thermostat data. The method includes generating by the processor a control signal responsive to the analysis and transmitting via the communication network the control signal to an HVAC controller, wherein the control signal causes the HVAC controller to control the HVAC unit.

26 Claims, 4 Drawing Sheets

(56) References Cited

U.S. PATENT DOCUMENTS

| | | |
|---|---|---|
| 2007/0097993 A1* | 5/2007 | Bojahra et al. ............... 370/401 |
| 2007/0114295 A1* | 5/2007 | Jenkins ........................ 236/51 |
| 2008/0099568 A1 | 5/2008 | Nicodem et al. |
| 2009/0302249 A1 | 12/2009 | Fincher |
| 2010/0070234 A1 | 3/2010 | Steinberg et al. |
| 2011/0112875 A1* | 5/2011 | Johnson ................. G06Q 50/06 705/7.11 |
| 2011/0295430 A1* | 12/2011 | Kouninski ................... 700/278 |
| 2012/0221150 A1* | 8/2012 | Arensmeier ....... G05B 23/0224 700/276 |
| 2013/0158720 A1* | 6/2013 | Zywicki et al. ............... 700/276 |
| 2014/0228983 A1* | 8/2014 | Groskreutz et al. ............ 700/83 |

* cited by examiner

METHODS AND SYSTEMS FOR REMOTELY MONITORING AND CONTROLLING HVAC UNITS

TECHNICAL FIELD

The present disclosure is directed, in general, to energy usage control and, more particularly, to methods and systems for remotely monitoring and controlling heating, ventilation, and air-conditioning (HVAC) units.

BACKGROUND OF THE DISCLOSURE

Improved HVAC monitoring and control systems are desirable.

SUMMARY OF THE DISCLOSURE

Various disclosed embodiments include methods, systems and mediums for monitoring and controlling HVAC units. The method includes receiving by a processor via a communication network supply temperature data indicating a supply air temperature in a duct coupled to an HVAC unit, the processor being located at a geographically remote location from the HVAC unit. The method includes receiving by the processor via the communication network zone temperature data of a space being maintained by the HVAC unit. The method includes receiving by the processor via the communication network thermostat data from a thermostat in the space. The thermostat data may include information such as, for example, whether or not the HVAC unit is attempting to heat, cool, or just run the fan; if the HVAC unit is in stage 1 or 2 of heating or cooling; and/or if the zone temperature is being monitored by the thermostat or is being monitored remotely. According to some disclosed embodiments, the method includes receiving by the processor other additional data such as, for example, data from humidity sensors, data from CO2 sensors, data from enthalpy sensors, or data from outside temperature sensors via the communication network. The method includes analyzing by the processor at least one of the supply temperature data, the zone temperature data, thermostat data, and other additional data to determine if the HVAC unit is malfunctioning. The method includes generating by the processor a control signal responsive to the analysis and transmitting via the communication network the control signal to an HVAC controller, wherein the control signal causes the HVAC controller to control the HVAC unit.

According to some disclosed embodiments, the method includes receiving by the HVAC controller zone temperature data, supply temperature data, thermostat data, outside temperature data, and other additional data. The method includes analyzing by the HVAC controller at least one of the zone temperature data, supply temperature data, thermostat data, outside temperature data, and other additional data. The method includes controlling by the HVAC controller one or more HVAC units in response to analysis of the data. The method includes transmitting by the HVAC controller a control signal to one or more thermostats which causes the HVAC units to be disabled or turned OFF.

The foregoing has outlined rather broadly the features and technical advantages of the present disclosure so that those skilled in the art may better understand the detailed description that follows. Additional features and advantages of the disclosure will be described hereinafter that form the subject of the claims. Those of ordinary skill in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software, or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Industrial and commercial facilities such as factories, retail stores, office buildings, and warehouses typically operate multiple HVAC units. If an HVAC unit malfunctions, the remaining HVAC units operate under additional stress. Consider, for example, a retail store which is operating five HVAC units to cool the store. If one of the HVAC units malfunctions, the four remaining HVAC units must run their compressors for a longer duration to cool the store. If, however, the four compressors are forced to run for a time period exceeding a maximum threshold, one or more additional compressors may also fail, subjecting the remaining operational units to further stress. Thus, it is necessary to quickly detect and repair the failed HVAC unit in order to prevent a problem from escalating.

Also, an HVAC unit may malfunction, causing it to operate in a manner that is detrimental or contradictory to a desired purpose. Consider, for example, a warehouse which is operating five HVAC units to cool the warehouse. If one of the HVAC units malfunctions causing it to blow hot air instead of cold air, the remaining operational units must operate for a longer duration to compensate for the hot air being blown by the malfunctioning unit. In such a scenario, it is necessary to quickly detect the malfunctioning unit so that it may be disabled and repaired.

Existing methods and systems generally do not allow remote automatic monitoring of HVAC units. Existing methods and systems do not provide remote monitoring of HVAC units so that failed units may be detected and taken offline for repair. Typically, a failed HVAC unit is detected due to a change in temperature at the facility or by physical inspection. After a failed HVAC unit is detected, the unit is manually taken offline for repair.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system.

Figure 1:
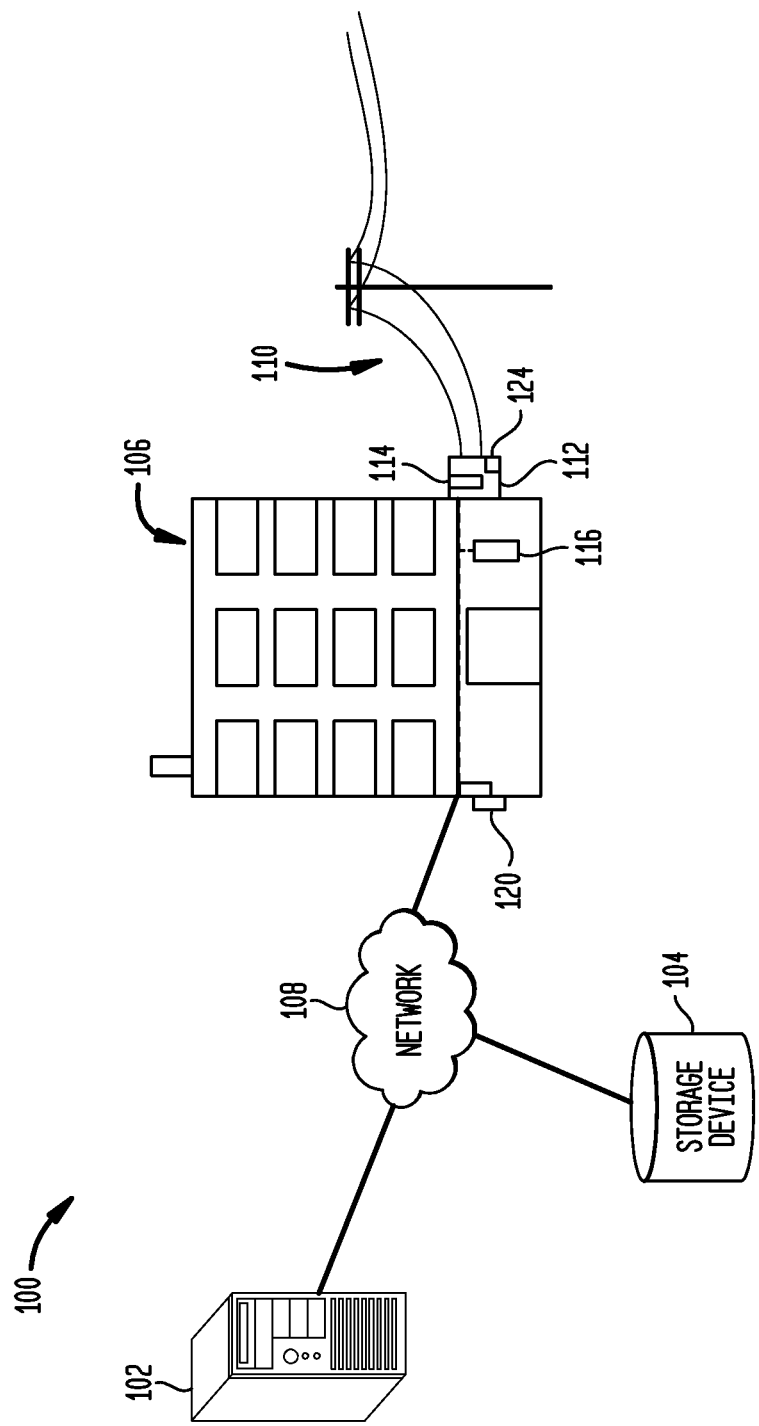
FIG. 1 illustrates a block diagram of an energy monitoring environment in which various embodiments of the present disclosure are implemented.

FIG. 1 illustrates a block diagram of system 100 in which various embodiments are implemented. In this illustrative embodiment, system 100 includes data processing system 102 connected to storage device 104 and building 106 via network 108. According to disclosed embodiments, data processing system 102 is located at a geographically remote location from building 106. Network 108 is a medium used to provide communication links between various data processing systems and other devices in system 100. Network 108 may include any number of suitable connections, such as wired, wireless, or fiber optic links. Network 108 may be implemented as a number of different types of networks, such as, for example, the internet, a local area network (LAN), or a wide area network (WAN).

Elements of the present disclosure may be implemented in data processing system 102 and storage device 104 in connection with network 108. For example, data processing system 102 may obtain supply temperature data via supply temperature sensor 114 indicating the temperature of the air supplied by one or more HVAC units 112. HVAC units 112 may be powered by power mains 110. Data processing system 102 is located at a geographically remote location from the HVAC units. According to disclosed embodiments, supply temperature sensor 114 may be positioned in an air duct (not shown in FIG. 1) coupled to HVAC units 112. Data processing system 102 may obtain zone temperature data via zone temperature sensor 116 indicating the temperature inside building 106. Zone temperature sensor 116 may be positioned inside building 106. Data processing system 102 may obtain outside temperature data indicating the outside temperature via outside temperature sensor 120 positioned outside building 106. According to disclosed embodiments, the supply temperature data, the zone temperature data, the outside temperature data, and other relevant data may be periodically acquired by the sensors and stored in HVAC controller 124. HVAC controller 124 may have a memory (not shown in FIG. 1) for storing the data.

According to disclosed embodiments, a processor (not shown in FIG. 1) in data processing system 102 may periodically request (or poll) HVAC controller 124 for the recorded data. In response to the polling from the processor, HVAC controller 124 may transmit the recorded data to the processor over network 108. According to other disclosed embodiments, HVAC controller 124 may periodically transmit the recorded data over network 108. For example, HVAC controller 124 may be configured to transmit the recorded data at every 15-minute interval or may be configured to transmit the recorded data when the data value changes. The processor in data processing system 102 may analyze the data to determine if one or more HVAC units are malfunctioning, and in response generate a control signal. Data processing system 102 may transmit the control signal to HVAC controller 124 over network 108. According to disclosed embodiments, the control signal may cause HVAC controller 124 to turn OFF (i.e. disable) one or more malfunctioning HVAC units, override scheduled operations, send messages to operators of the HVAC units, or take other actions.

The description of system 100 in FIG. 1 is intended as an example and not as a limitation on the various embodiments of the present disclosure. For example, system 100 may include additional server computers, client devices, and other devices not shown. In some embodiments, all or some of the functionality of the data processing system 102 may be implemented at building 106. In some embodiments, all or some of the functionality of data processing system 102 may be implemented in one or more server computers in a cloud computing environment within network 108.

Figure 2:
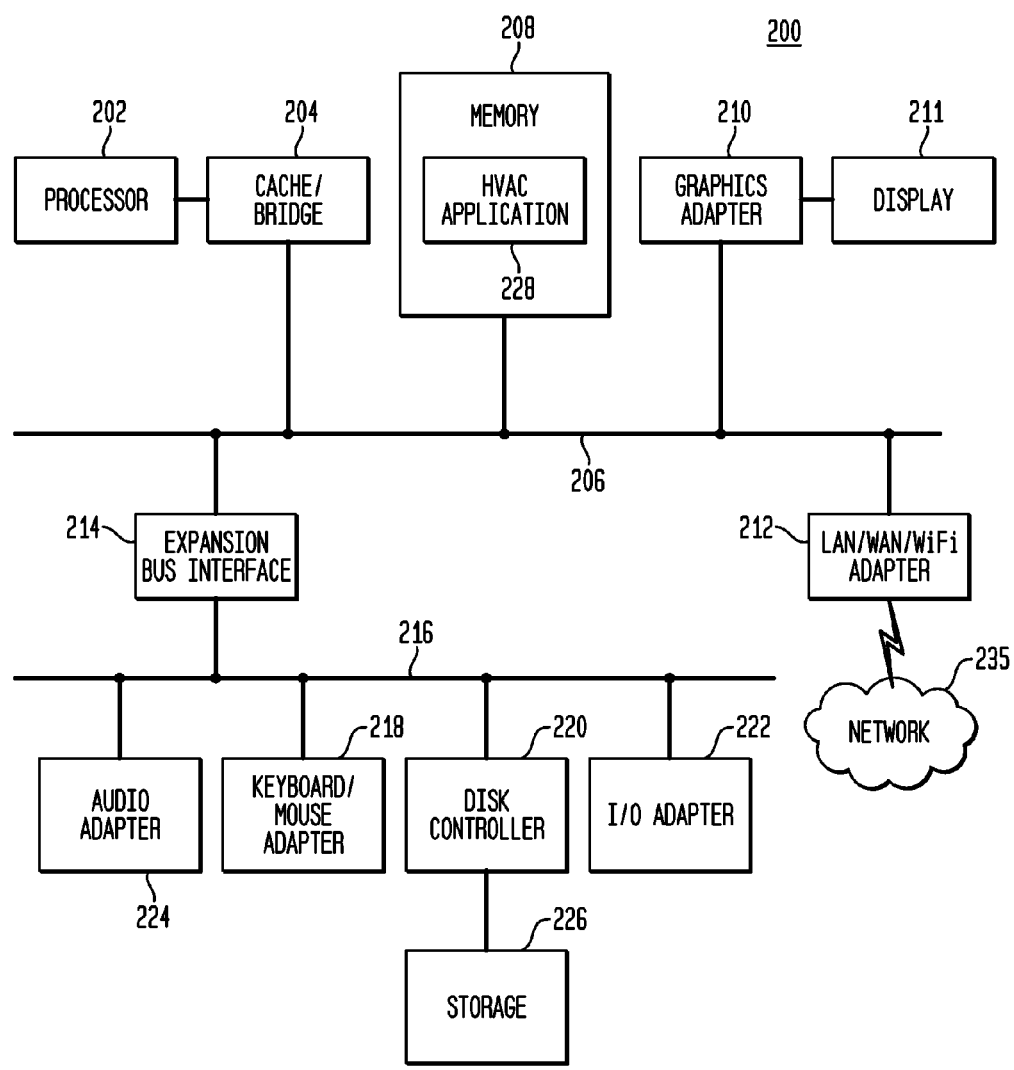
FIG. 2 illustrates a block diagram of a data processing system in which various embodiments are implemented.

FIG. 2 depicts a block diagram of data processing system 200 in which various embodiments are implemented. The data processing system 200 includes processor 202 connected to a level two cache/bridge 204, which is connected in turn to local system bus 206. Local system bus 206 may be, for example, a peripheral component interconnect (PCI) architecture bus. Also connected to local system bus 206 in the depicted example are main memory 208 and graphics adapter 210. Graphics adapter 210 may be connected to display 211.

Other peripherals, such as local area network (LAN)/Wide Area Network/Wireless (e.g. WiFi) adapter 212, may also be connected to local system bus 206. Expansion bus interface 214 connects the local system bus 206 to input/output (I/O) bus 216. I/O bus 216 is connected to keyboard/mouse adapter 218, disk controller 220, and I/O adapter 222. Disk controller 220 may be connected to storage 226, which may be any suitable machine-usable or machine-readable storage medium, including, but not limited to nonvolatile, hard-coded type mediums such as read only memories (ROMs), or erasable, electrically programmable read only memories (EEPROMs), magnetic tape storage, and user-recordable type mediums, such as floppy disks, hard disk drives, and compact disk read only memories (CD-ROMs) or digital versatile disks (DVDs), and other known optical, electrical, or magnetic storage devices.

Also connected to I/O bus 216 in the example shown is audio adapter 224, to which speakers (not shown) may be connected for playing sounds. Keyboard/mouse adapter 218 provides a connection for a pointing device (not shown), such as a mouse, trackball, trackpointer, etc. In some embodiments, data processing system 200 may be implemented as a touch screen device, such as, for example, a tablet computer or touch screen panel. In these embodiments, elements of keyboard/mouse adapter 218 may be implemented in connection with display 211.

In various embodiments of the present disclosure, data processing system 200 is a computer in system 100, such as data processing system 102. Data processing system 200 implements HVAC application 228, which may be a software application that analyzes data transmitted by HVAC controller 124 and in response generates one or more control signals for controlling the operation of one or more HVAC units. HVAC application 228 may include program code for periodically polling HVAC controller 124 for recorded data and program code for analyzing the data to generate one or more control signals. The control signals are transmitted to HVAC controller 124 over network 108.

Those of ordinary skill in the art will appreciate that the hardware depicted in FIG. 2 may vary for particular implementations. For example, other peripheral devices, such as an optical disk drive and the like, also may be used in addition to or in place of the hardware depicted. The depicted example is provided for the purpose of explanation only and is not meant to imply architectural limitations with respect to the present disclosure.

One of various commercial operating systems, such as a version of Microsoft Windows™, a product of Microsoft Corporation located in Redmond, Wash., may be employed if suitably modified. The operating system is modified or created in accordance with the present disclosure as described, for example, to implement application 228.

LAN/WAN/Wireless adapter 212 may be connected to network 235 which may be any public or private data processing system network or combination of networks, as known to those of skill in the art, including the Internet. Data processing system 200 may communicate over network 235 to one or more computers, which are also not part of data processing system 200, but may be implemented, for example, as a separate data processing system 200.

According to disclosed embodiments, a remote data center may be provided which monitors a plurality of managed sites, each site operating a plurality of HVAC units. The managed sites may, for example, be a retail store, a commercial building, or an industrial facility. The remote data center may be linked to the plurality of managed sites via a communication network such as the Internet. The remote data center may include a data processing system such as data processing system 102 to remotely monitor and control the plurality of HVAC units.

According to disclosed embodiments, a processor in the remote data center periodically polls the HVAC units for supply temperature data, zone temperature data, thermostat data, outside temperature data, and other relevant information. In response, the HVAC units transmit the data to the requesting processor via the communication network. According to some disclosed embodiments, an HVAC controller transmits the data to the processor over the communication network. The processor may include program code including algorithm for analyzing the data and for generating one or more control signals that are transmitted back to the HVAC controller. The control signals may cause the HVAC controller to override scheduled operation of the HVAC units and to disable one or more malfunctioning HVAC units. According to some disclosed embodiments, in response to the control signal, the HVAC controller may transmit a disable signal to a thermostat which causes the thermostat to disable the malfunctioning HVAC units.

According to some disclosed embodiments, only malfunctioning HVAC units having a detrimental effect on a zone may be disabled. For example, a malfunctioning HVAC unit blowing hot air but which is supposed to blow cool air may be disabled. A malfunctioning HVAC unit which does not have a detrimental effect on the zone may not be disabled. A malfunctioning HVAC unit, for example, blowing outside air when it is scheduled to blow cool air may not be disabled if the outside temperature is cooler than a thermostat set-point temperature or is below a threshold temperature. According to disclosed embodiments, the program code in the processor includes algorithm to determine which malfunctioning HVAC units may have a detrimental effect on the zone, and thus should be disabled. The processor transmits one or more control signals to the HVAC units which may cause the HVAC controllers to disable one or more malfunctioning units. According to some disclosed embodiments, in response to the control signals, the HVAC controllers may transmit one or more disable signals to one or more thermostats causing the thermostats to disable the malfunctioning HVAC units.

Additionally, the data processing system may send messages to site managers notifying that one or more malfunctioning HVAC units have been disabled and may also indicate the reasons for disabling the malfunctioning HVAC units. According to disclosed embodiments, a log or a record may be created at the data processing system listing the disabled HVAC units and the reasons for disabling the units.

Figure 3:
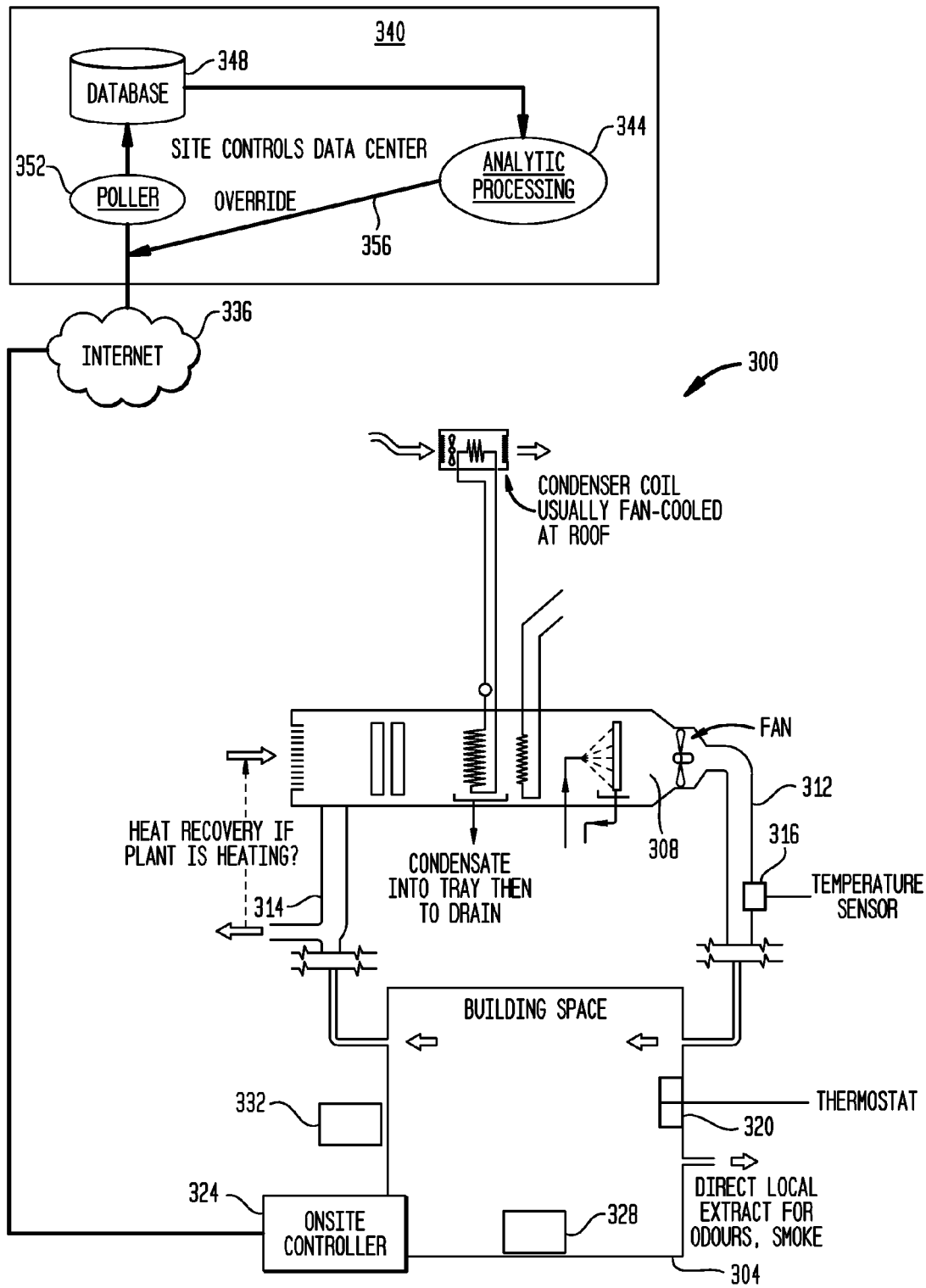
FIG. 3 illustrates a system for monitoring and controlling an HVAC unit according to disclosed embodiments.

FIG. 3 illustrates system 300 for monitoring and controlling an HVAC unit according to an embodiment. System 300 includes HVAC unit 308 which services building 304. Although the exemplary embodiment of FIG. 3 shows only a single HVAC unit, it will be appreciated that the embodiments may be implemented to monitor and control a plurality of HVAC units distributed across one or more managed sites such as retail stores, commercial buildings, or industrial facilities.

HVAC unit 308 pumps air into building 304 via duct 312 and extracts air from building via duct 314. Temperature sensor 316 positioned in duct 312 senses the temperature of air supplied to building 304. Thermostat 320 positioned inside building 304 sets a desired set-point temperature of building 304. Zone temperature sensor 328 positioned inside building 304 senses the zone temperature. According to some disclosed embodiments, thermostat 320 may be equipped with a zone temperature sensor for sensing the temperature inside building 304, thus eliminating the need for a separate zone temperature sensor. Outside temperature sensor 332 may be placed outside building 304 to sense the outside air temperature.

According to disclosed embodiments, HVAC controller 324 may be connected to HVAC unit 308 and also to the various temperature sensors. HVAC controller 324 may be configured to periodically receive temperature data from sensors 316, 328 and 332 and to store the temperature data locally in a memory (not shown in FIG. 3). According to disclosed embodiments, HVAC controller 324 may be configured to control HVAC unit 308 by overriding scheduled operation and disabling the HVAC unit.

According to disclosed embodiments, system 300 includes data processing system 340 connected to HVAC controller 324 via communication network 336. According to some disclosed embodiments, data processing system 340 is located at a geographically remote location from HVAC unit 308. Communication network 336 may be the Internet or any other type of communication network. Data processing system 340 includes processor 344, which may include program code for analytic processing of various data received from HVAC controller 324. Data processing system 340 may include poller 352 configured to periodically poll HVAC controller 324. In response, HVAC controller 324 periodically transmits recorded data to poller 352 via network 336. Data processing system 340 includes database 348 configured to store the temperature data. Processor 344 may access database 348 to retrieve and analyze the stored data. Processor 344 may include program code for analyzing the stored data to determine if the HVAC unit is malfunctioning and for generating one or more control signals 356 which may be transmitted to HVAC controller 324 over network 336. As discussed before, control signals 356 may cause HVAC controller 324 to disable HVAC unit 308. According to some disclosed embodiments, in response to control signals 356, HVAC controller 324 may transmit a disable signal to thermostat 320 causing thermostat 320 to disable HVAC unit 308.

According to disclosed embodiments, processor 344 may include program code configured to analyze a wide range of conditions and to generate one or more control signals responsive to the conditions. Consider, for example, a scenario wherein the thermostat set-point is 75 degrees, the zone temperature is 75 degrees, but the supply air temperature is 85 degrees. Based on analysis of data recorded over a predetermined time period, processor 344 may determine that HVAC unit 308 is malfunctioning, but other HVAC units in the building may be cooling the space. Accordingly, processor 344 may generate a control signal to cause HVAC controller 324 to disable HVAC unit 308 for repair and to send a message notifying that the malfunctioning unit has been disabled.

Consider, for example, another scenario wherein the thermostat set-point is 75 degrees, the outside temperature is 90 degrees, but the supply air temperature is 90 degrees. Based on analysis of data recorded over a predetermined time period, processor 344 may determine that HVAC 308 is malfunctioning and is likely blowing outside air. Accordingly, HVAC unit 308 may be disabled for repair.

Consider, for example, another scenario wherein the thermostat set-point is 66 degrees, outside temperature is 85 degrees, but the supply air temperature is 100 degrees. Based on analysis of data recorded over a predetermined time period, processor 344 may determine that HVAC unit 308 is heating building 304 instead of cooling, thus having a detrimental effect on the zone temperature. Accordingly, processor 344 may send a control signal to HVAC controller 324 to cause HVAC unit 308 to be disabled.

Consider, for example, another scenario wherein the thermostat heat/cool set-point is 64/73 degrees, the zone temperature is 75 degrees, and the supply air temperature is 85 degrees. Analysis of data over a predetermined period of time may indicate that the HVAC unit 308 is not working well, but the fan is blowing most of the time. Accordingly, the HVAC unit 308 may be disabled for repair by processor 344.

Consider, for example, another scenario wherein HVAC unit 308 has a heating setpoint of 67 and a cooling setpoint of 76. The outside air temperature is 25 degrees, so the HVAC unit should be heating the space in building 304. The zone temperature is 55 degrees and the supply air temperature is 30 degrees. Analysis of data over a predetermined period of time may indicate that HVAC unit 308 is likely blowing cold outside air into building 304. Accordingly, the HVAC unit 308 may be disabled until it can be repaired.

According to some disclosed embodiments, a processor may include program code for executing the following processes:

(1) An HVAC unit will be turned OFF if the thermostat is set for cooling, but the supply air temperature is greater than the zone temperature by a predetermined amount.

(2) An HVAC unit will be turned OFF if the thermostat is set for heating, but the supply air temperature is less than the zone temperature by a predetermined amount.

(3) The zone temperature may be considered a factor in determining if the HVAC unit should be turned OFF, but not the exclusive factor. For example, the HVAC unit may be turned OFF even if the zone temperature is within specification if the processor determines that other HVACs at the site may be compensating for the malfunctioning HVAC unit.

(4) The processor may consider indoor and outdoor humidity data, if available. If the HVAC unit is performing poorly but is still dehumidifying the space, HVAC 308 may not be turned OFF.

(5) The processor may prevent all HVAC units from being turned OFF since they may provide air circulation.

(6) The HVAC unit may not be turned OFF if the site indicates accordingly. For example, the site may indicate that the HVAC unit supplies air to a computer room or a data center, and thus the HVAC unit may be considered too important for automatic control and therefore may not be turned OFF.

(7) The HVAC unit will not be turned OFF if $CO_2$ level in the space is greater than a maximum allowable level.

Figure 4:
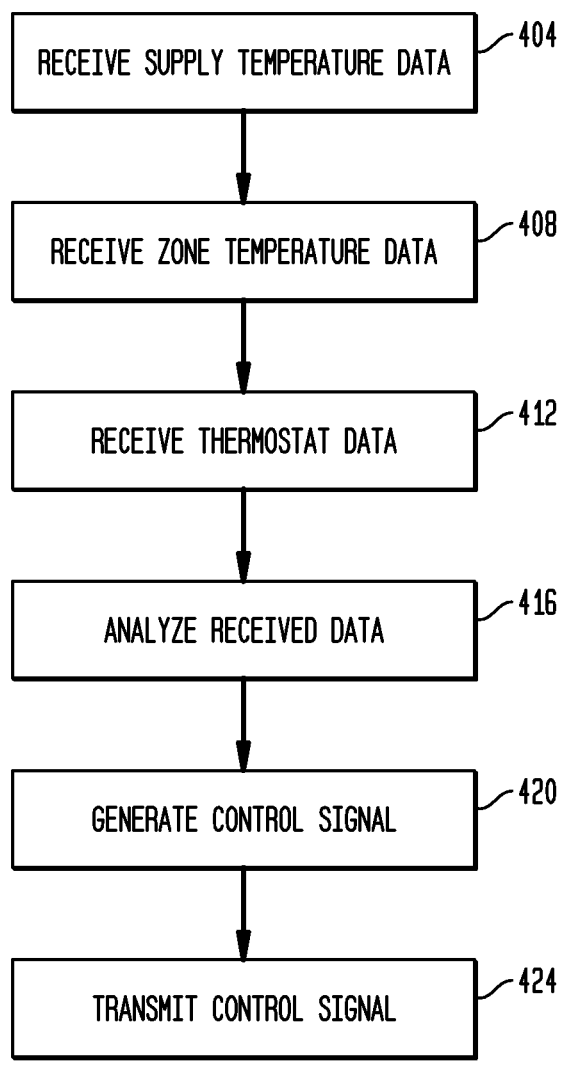
FIG. 4 depicts a flowchart of a process for monitoring and controlling an HVAC unit according to disclosed embodiments.

FIG. 4 depicts a flowchart of a process for monitoring and controlling an HVAC unit in accordance with disclosed embodiments. This process may be performed, for example, in one or more data processing systems, such as, for example, data processing system 200, configured to perform acts described below, referred to in the singular as "the system." The process may be implemented by executable instructions stored in a non-transitory computer-readable medium that cause one or more data processing systems to perform such a process. For example, HVAC application 228 may comprise the executable instructions to cause one or more data processing systems to perform such a process.

The process begins in block 404 with the system receiving supply temperature data indicating a supply air temperature in a duct coupled to the HVAC unit. The system may receive the supply temperature data from an HVAC controller in response to polling by a poller associated with the system. The supply temperature data may be transmitted over a communication network such as the Internet.

In block 408, the system receives zone temperature data of a space being served by the HVAC unit. The zone temperature data may, for example, indicate the temperature of a space inside a building. The zone temperature data may be sensed by a sensor positioned inside the building.

In block 412, the system receives thermostat data from a thermostat in the space. The thermostat may, for example, be set to maintain the space at a desired temperature.

In block 416, the system analyzes the received data. The system may, for example, execute instructions in HVAC application 228 to analyze the received data.

In block 420, the system generates one or more control signals responsive the analysis. In block 424, the system transmits the control signals to an HVAC controller. The control signal may, for example, cause the HVAC controller to disable the HVAC unit. According to some disclosed embodiments, in response to the control signal the HVAC controller may transmit a disable signal to a thermostat causing the thermostat to disable the HVAC unit.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of the data processing system may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for remotely monitoring and controlling a heating, ventilation and air-conditioning (HVAC) unit, the method comprising:
receiving by a processor via a communication network supply temperature data indicating a supply air temperature in a duct coupled to the HVAC unit, the processor located at a geographically remote location from the HVAC unit;
receiving by the processor via the communication network zone temperature data of a space maintained by the HVAC unit;
receiving by the processor via the communication network thermostat data from a thermostat in the space;
analyzing by the processor at least one of the supply temperature data, the zone temperature data and the thermostat data to determine whether the HVAC unit is malfunctioning;
generating by the processor a control signal responsive to the analysis; and
transmitting via the communication network the control signal to an HVAC controller, wherein the control signal causes the HVAC controller to transmit a disable signal to a thermostat causing the HVAC unit to be disabled by the thermostat.

2. The method of claim 1, wherein the control signal causes the HVAC controller to disable the HVAC unit.

3. The method of claim 1, further comprising:
periodically sensing the supply air temperature in the duct to generate the supply temperature data;
storing the supply temperature data in the HVAC controller; and
transmitting via the communication network the supply temperature data to the processor.

4. The method of claim 1, further comprising:
periodically sensing the zone temperature of the space to generate the zone temperature data;
storing the zone temperature data in the HVAC controller; and
transmitting via the communication network the zone temperature data to the processor.

5. The method of claim 1, further comprising:
periodically storing the thermostat data in the HVAC controller; and
transmitting via the communication network the thermostat data to the processor.

6. The method of claim 1, further comprising:
periodically polling the HVAC controller for the supply temperature data, the zone temperature data and the thermostat data; and
transmitting the supply temperature data, the zone temperature data and the thermostat data via the communication network to the processor responsive to the polling.

7. The method of claim 1, further comprising periodically transmitting by the HVAC controller the supply temperature data, the zone temperature data and the thermostat data via the communication network to the processor.

8. The method of claim 1, further comprising transmitting by the HVAC controller the supply temperature data, the zone temperature data and the thermostat data via the communication network to the processor when one or more data values change.

9. The method of claim 1, further comprising storing the zone temperature data, the supply temperature data and the thermostat data in a database connected to the processor.

10. The method of claim 1, further comprising generating the control signal to turn off the HVAC unit when the thermostat is set for cooling and a supply temperature is higher than a zone temperature.

11. The method of claim 1, further comprising generating the control signal to turn off the HVAC unit when the outside temperature is greater than a maximum threshold temperature and a supply temperature is greater than a zone temperature.

12. The method of claim 1, further comprising generating the control signal to turn off the HVAC unit when a thermostat is set for heating and the supply temperature is lower than the zone temperature.

13. The method of claim 1, further comprising generating the control signal to turn off the HVAC unit when the outside temperature is less than a maximum threshold temperature and the supply temperature is less than the zone temperature.

14. The method of claim 1, further comprising:
generating the control signal to turn off the HVAC unit for a predetermined time period;
transmitting the control signal over the communication network to the HVAC controller; and
transmitting a message indicating that the HVAC has been turned off for a predetermined time period.

15. A method for remotely monitoring and controlling a plurality of heating, ventilation and air-conditioning (HVAC) units, the method comprising:
receiving by a processor via a communication network respective supply air temperature data of the plurality of HVAC units, the processor located at a geographically remote location from the HVAC units;
receiving by the processor via the communication network zone temperature data of the plurality of HVAC units;
receiving by the processor via the communication network thermostat data of the plurality of HVAC units;
analyzing by the processor at least one of the supply temperature data, the zone temperature data and thermostat data of the plurality of HVAC units to determine whether one or more of the plurality of HVAC units are malfunctioning;
generating by the processor one or more control signals responsive to the analysis; and
transmitting via the communication network the one or more control signals to an HVAC controller, wherein the one or more control signal causes the HVAC controller to transmit a disable signal to a thermostat causing the one or more malfunctioning HVAC units to be disabled by the thermostat.

16. The method of claim 15, further comprising:
turning off the one or more malfunctioning HVAC units in response to the one or more control signals; and
transmitting a message indicating that the one or more HVAC units have been turned off for a predetermined time period.

17. The method of claim 15, further comprising:
periodically sensing an air temperature in a duct to generate the supply temperature data;
storing the supply air temperature data in the HVAC controller; and
transmitting via the communication network the supply temperature data to the processor.

18. The method of claim 15, further comprising:
periodically sensing a temperature of a space to generate the zone temperature data;
storing the zone temperature data in the HVAC controller; and
transmitting via the communication network the zone temperature data to the processor.

19. The method of claim 15, further comprising:
periodically storing the thermostat data in the HVAC controller; and
transmitting via the communication network the thermostat data to the processor.

20. The method of claim 15, further comprising:
periodically polling the HVAC controller for the supply temperature data, the zone temperature data and the thermostat data; and
transmitting the supply temperature data, the zone temperature data and the thermostat data via the communication network to the processor responsive to the polling.

21. The method of claim 15, further comprising periodically transmitting by the HVAC controller the supply temperature data, the zone temperature data and the thermostat data via the communication network to the processor.

22. The method of claim 15, further comprising transmitting by the HVAC controller the supply temperature data, the zone temperature data and the thermostat data via the communication network to the processor when one or more data values change.

23. The method of claim 15, further comprising storing the zone temperature data, the supply temperature data and the thermostat data in a database connected to the processor.

24. A data processing system configured to monitor and control a heating, ventilation and air-conditioning (HVAC) unit, the data processing system being located at a geographically remote location from the HVAC unit, the data processing system comprising:
a storage device comprising an HVAC application;
an accessible memory comprising instructions of the HVAC application; and
a processor configured to execute the instructions of the HVAC application to:
receive via a communication network supply temperature data indicating a supply air temperature in a duct coupled to the HVAC unit;
receive via the communication network zone temperature data of a space being maintained by the HVAC unit;
receive via the communication network thermostat data from a thermostat in the space;
analyze at least one of the supply temperature data, the zone temperature data and thermostat data to determine whether the HVAC unit is malfunctioning;
generate a control signal responsive to the analysis; and
transmit via the communication network the control signal to an HVAC controller, wherein the control signal causes the HVAC controller to transmit a disable signal to a thermostat causing the HVAC unit to be disabled by the thermostat.

25. The data processing system of claim 24, wherein the processor is further configured to execute the instructions of the HVAC application to:
generate the control signal to turn off the HVAC unit for a predetermined time period;
transmit the control signal over the communication network to the HVAC controller; and
transmit a message indicating that the HVAC has been turned off for a predetermined time period.

26. A non-transitory computer-readable medium encoded with executable instructions that, when executed, cause one or more data processing systems to:
receive via a communication network supply temperature data indicating an air temperature in a duct coupled to an HVAC unit;
receive via the communication network zone temperature data of a space being maintained by the HVAC unit;
receive via the communication network thermostat data from a thermostat in the space;
analyze at least one of the supply temperature data, the zone temperature data and thermostat data to determine whether the HVAC unit is malfunctioning;
generate a control signal responsive to the analysis; and
transmit via the communication network the control signal to an HVAC controller, wherein the control signal causes the HVAC controller to transmit a disable signal to a thermostat causing the HVAC unit to be disabled by the thermostat.

* * * * *